United States Patent
Amada et al.

[11] Patent Number: 5,602,816
[45] Date of Patent: Feb. 11, 1997

[54] RECORDING AND REPRODUCING SYSTEM AND EQUALIZING METHOD FOR USE IN IT

[75] Inventors: Nobutaka Amada; Toshifumi Takeuchi; Takao Arai, all of Yokohama, Japan

[73] Assignee: Hitachi, Ltd., Tokyo, Japan

[21] Appl. No.: 517,584

[22] Filed: Aug. 22, 1995

[30] Foreign Application Priority Data

Sep. 2, 1994 [JP] Japan .................................. 6-210098

[51] Int. Cl.⁶ .................................................. G11B 27/36
[52] U.S. Cl. .................................. 369/59; 369/124
[58] Field of Search ........................ 369/124, 59, 60; 330/304; 360/65, 39

[56] References Cited

U.S. PATENT DOCUMENTS 3,647,964  3/1972  Tang ................................. 375/290

OTHER PUBLICATIONS

"Association of Television Technology" vol. 42, Numer 4, Apr. 1988, pp. 330–336.

Primary Examiner—Nabil Z. Hindi
Attorney, Agent, or Firm—Antonelli, Terry, Stout & Kraus

[57] ABSTRACT

An object of the present invention is to increase the recording density of digital information signal in a recording medium without changing parameters of the recording medium and a RLL code. To accomplish the object, the present invention has a frequency response of the equalizer set so that an overall transmission frequency characteristic H(f) of the RLL coder, the recording medium, and the equalizer to an impulse becomes the one given by an equation below $$H(f) = \cos\left(\frac{\pi}{2} \cdot \frac{f}{Fm}\right)$$

where Fm denotes a cut-off frequency of the recording medium.

12 Claims, 9 Drawing Sheets

RECORDING AND REPRODUCING SYSTEM AND EQUALIZING METHOD FOR USE IN IT

BACKGROUND OF THE INVENTION

The present invention relates to a recording and reproducing system for recording and reproducing digital information signal in a recording medium such as CD and an equalizing method for use in it. More particularly, it concerns a recording and reproducing system and an equalizing method for use in it that makes it possible to increase recording density of digital information signal without changing parameters inherent to a recording medium.

Conventionally, the art of such a technique has been disclosed in, for example, "Association of Television Technology," Vol. 42, No. 4 (Apr, 1988), pp. 330–337. The prior art is described below.

A digital information signal to be recorded in a recording medium, such as a CD, is modulated by a run length limited (hereinafter referred to as the RLL) coder with use of the socalled (d, k) RLL code of minimum run length d and maximum run length k before being recorded. The signal reproduced from the recording medium is equalized by an equalizer before being decoded to the original digital information signal by a decoder to feed out.

FIG. 9 shows a frequency response M(f) of the RLL coder and a general overall transmission frequency response H(f) of the RLL decoder, the recording medium, and the equalizer. Curves (a) and (b) in the figure indicate the frequency response M(f) and the overall transmission frequency response H(f), respectively. Fb, Fn, and Fm in the figure indicate a recording bit rate after the modulation, a Nyquist frequency (=(Fb/d)/2), and a cut-off frequency of the recording medium 3, respectively. In general, the frequency response E(f) of the equalizer is set so that as shown by curve (b), the overall transmission frequency response H(f) should become a raised cosine characteristic (100% roll-off factor) of a Nyquist frequency Fn. The recording bit rate Fb therefore can be increased until bandwidth B (=2·Fn) of the overall transmission frequency response H(f) become the cut-off frequency Fm. Hence, the recording bit rate Fb is given with respect to the cut-off frequency Fm as $$Fb = d \cdot Fm \quad (1)$$

FIG. 10 shows an eye pattern of the output signal of the equalizer 4 with the minimum run length d being 3. If the recording medium 3 is an optical disk, the cut-off frequency Fm of the recording medium 3 is given by an equation below:

$$Fm \approx \frac{2 \cdot V \cdot NA}{\lambda} \quad (2)$$

where $\lambda$ denotes a wavelength of laser, NA is a numerical aperture of an optical system, and V is a linear velocity of the recording medium.

As an example, a CD system with the minimum run length d of 3 can be made to have the recording bit rate Fb of around 4.32 Mbps and the bandwidth B of around 1.44 MHz. From Eq. 2, the cut-off frequency Fm becomes around 1.44 MHz that is equal to the bandwidth B if the wavelength $\lambda$ of the laser is 0.78 μm, the numerical aperture NA of the optical system is 0.45, and the linear velocity of the optical disk is 1.25 m/sec.

SUMMARY OF THE INVENTION

In general, the recording density of digital information signal can be increased by way of changing parameters of the recording medium, such as the wavelength $\lambda$ of the laser of the optical disk, and parameters of the RLL code, such as minimum run length d. However, it has not been known how to increase the recording density further, or how to increase it without changing those parameters.

If it is tried to increase the recording density without changing the parameters of the recording medium and those of the RLL code with use of the prior art described above, the following problems arise, which are described with reference to FIGS. 11 and 12.

In FIG. 11, curve (a') indicates a frequency response M(f) of the RLL coder 2, curve (b') is an overall frequency response H(f), K is a coefficient of recording density increment, Fb' is a recording bit rate (=K·Fb), and Fn' is a Nyquist frequency (=(Fb'/d)/2=K·Fn). Of course, the cut-off frequency Fm of the recording medium is constant since the parameters of the recording medium and the RLL code are unchangeable. With respect to the prior art, the frequency response E(f) of the equalizer is set so that as shown by curve (b'), the transmission frequency response H(f) should become a roll-off raised cosine characteristic of a Nyquist frequency Fn'. That is, the bandwidth B of the transmission frequency response H(f) is limited by the cut-off frequency Fm, and the roll-off factor $\beta$ is decreased with the coefficient K. Such relationships are given by $$B = (1+\beta) \cdot Fn' = (1+\beta) \cdot K \cdot Fn \quad Fm = 2 \cdot Fn$$

Hence, $$\therefore \beta = \frac{2}{K} - 1 \quad (3)$$

If the coefficient K in Eq. 3 above is 1.5, or if the recording density is increased 1.5 times, the roll-off factor $\beta$ is decreased to 33.3%. If the minimum run length d is 3, the eye pattern of the output signal of the equalizer becomes the one as shown in FIG. 12, resulting in that an open area ratio of the eye pattern is deteriorated to a great extent.

As described above, the prior art has the open area ratio of the eye pattern deteriorated if trying to increase the recording density with the parameters of the recording medium and the RLL code made constant. This does not allow making a signal-to-noise ratio high. The system of the prior art therefore is likely affected by noises. That is, it is difficult that the prior art increases the recording density further with the parameters of the recording medium and the RLL code made constant.

In view of the foregoing, it is an object of the present invention to solve the problems of the prior art to provide a recording and reproducing system that makes it possible to increase recording density of digital information signal further without changing parameters of a recording medium and a RLL code and an equalizing method for use in it.

Briefly, the foregoing object is accomplished in accordance with aspects of the present invention by the recording and reproducing system, comprising a RLL coder for modulating a digital information signal to be recorded in a recording medium with use of a run length limited code having a minimum run length d, an equalizer for equalizing a signal reproduced from the recording medium, and a decoder for decoding a signal equalized by the equalizer to the original digital information signal, wherein a frequency response of the equalizer is set so that a transmission frequency characteristic H(f) of the RLL coder, the recording medium, and the equalizer to an impulse becomes the one given by Eq. 4 below $$H(f) = \cos\left(\frac{\pi}{2} \cdot \frac{f}{Fm}\right) \quad (4)$$

where Fm denotes a cut-off frequency of the recording medium that is given by Eq. 5 below $$Fm = \frac{Fb}{d \cdot K} \quad (5)$$

With the frequency response of the equalizer is set as such, virtually all the isolated pulses are overlapped together from the minimum run length d to the maximum run length k. This gives little interference among the pulses even if the pulses come at random. The equalizing method of the present invention therefore provides sufficient open area ratio of eye pattern even with the recording density made high, or the recording density can be made high without lowering the signal-to-noise ratio.

BRIEF DESCRIPTION OF THE DRAWINGS

The present invention may be more fully described by reference to the accompanying drawings in which.

DETAILED DESCRIPTION OF THE PREFERRED EMBODIMENTS

The following describes in detail a first embodiment according to the present invention by reference to the accompanying drawings.

Figure 1:
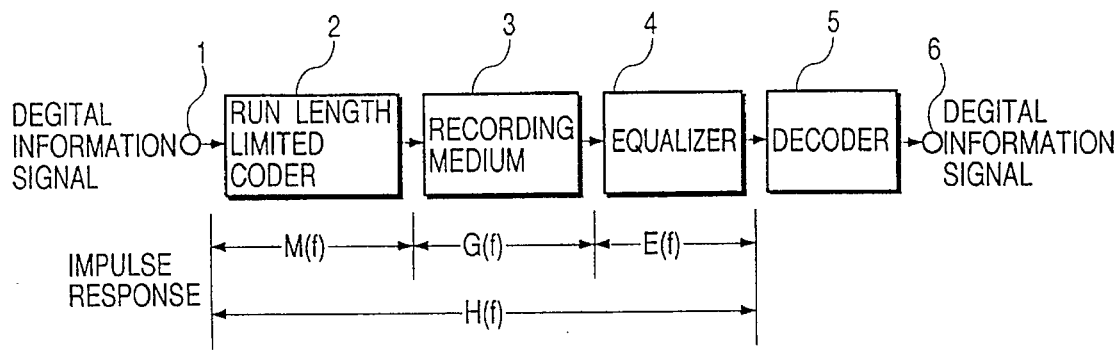
FIG. 1 depicts a block diagram illustrating a construction for the digital information signal recording and reproducing system of the present invention.

FIG. 1 depicts a block diagram illustrating a construction for the digital information signal recording and reproducing system that is an embodiment of the present invention. In the figure are shown an input terminal 1, a run length limited (RLL) coder 2, a recording medium 3, an equalizer 4, a decoder 5, and an output terminal 6. In the figure, also, M(f), G(f), and E(f) indicate frequency responses of the RLL coder 2, the recording medium 3, the equalizer 4 to an impulse, respectively. Further, H(f) indicates an overall transmission frequency response of the RLL coder 2 to the equalizer 4 to the impulse.

In FIG. 1, the digital information signal entered from the input terminal 1 is modulated by the RLL coder 2 with the (d, k) RLL code of minimum run length d and maximum run length k before being recorded in the recording medium 3. As an example, the RLL coder 2 of a digital audio system having a compact disk (CD) used as the recording medium 3 employs a modulation method called the EFM (Eight-to-Fourteen Modulation) of which the minimum run length d is 3 and the maximum run length k is 11.

A signal reproduced from the recording medium 3 is equalized by the equalizer 4. The equalized signal is decoded to the original digital information signal by the decoder 5. The decoded digital information signal is fed out of the output terminal 6.

Figure 13:
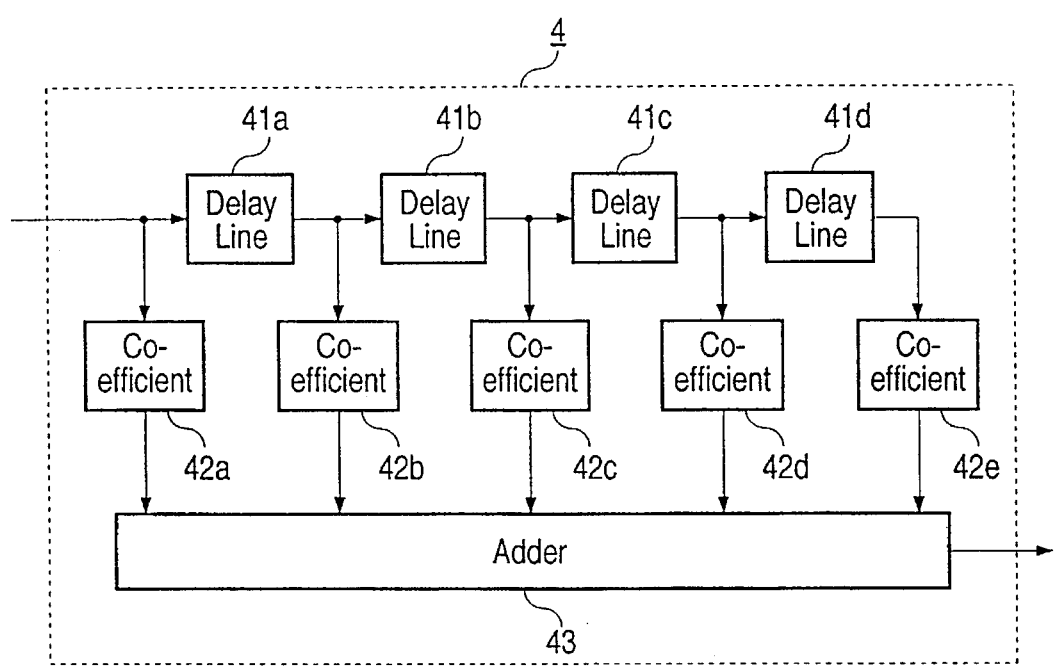

The present invention serves to set the frequency response E(f) of the equalizer 4 so that the overall transmission frequency response H(f) of the RLL coder 2 to the equalizer 4 to the impulse can be made as given by Eq. 4 previously. FIG. 13 shows an example of construction of the equalizer 4.

In FIG. 13 are indicated delay lines 41a, 41b, 41c, and 41d that delay the signal reproduced from the recording medium 3 by predetermined times τ. The figure also shows multipliers 42a, 42b, 42c, 42d, and 42e that multiply by coefficients c the signal reproduced from the recording medium 3 and to the signals delayed through the delay lines 41a, 41b, 41c, and 41d. The figure further shows an adder 43 that adds the signals from the multipliers 42a, 42b, 42c, 42d, and 42e before feeding out to the decoder 5. To set the frequency of the equalizer 4 constructed above so that the overall transmission frequency response H(f) can be made as given by Eq. 4, the coefficients c of the multipliers 42a, 42b, 42c, 42d, and 42e and the delay times τ of the delay lines 41a, 41b, 41c, and 41d should be adjusted appropriately depending on the frequency response M(f) of the RLL coder 2 and the frequency response G(f) of the recording medium 3.

Figure 2:
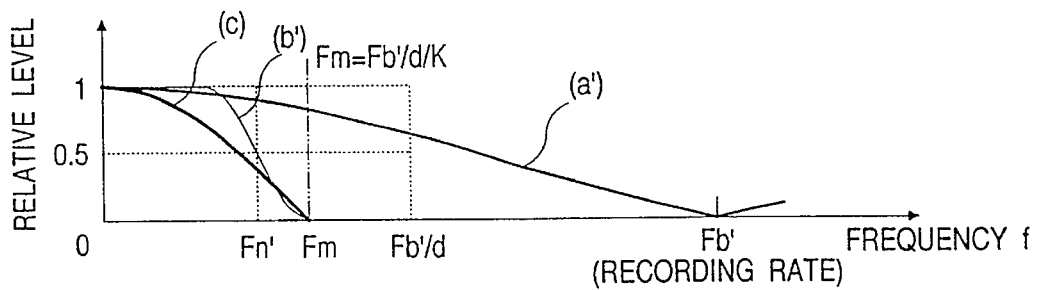
FIG. 2 depicts a graph illustrating frequency responses of the equalizing method of the present invention.

FIG. 2 depicts a graph illustrating frequency responses of the equalizing method of the present invention. A curve (c) represents the overall transmission frequency response H(f). In the figure, d indicates the minimum run length of the RLL recording code, Fb' is a recording bit rate, Fn' is a Nyquist frequency, and K is a recording density increment coefficient. The overall transmission frequency response H(f), as described previously, is the cosine characteristic represented by Eq. 4 given before. It need hardly be said that the bandwidth B of the cosine characteristic is equal to the cut-off frequency Fm. The present invention sets the frequency response E(f) of the equalizer 4 so that the overall transmission frequency response H(f) can be made as shown by the curve (c) in the figure.

Figure 3:
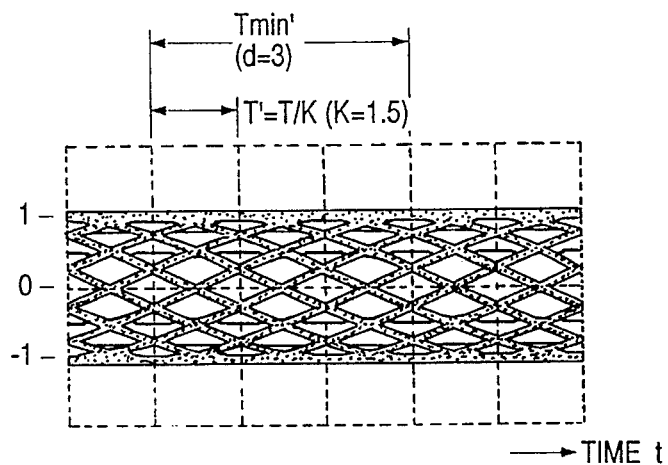
FIG. 3 depicts an example of eye pattern with use of the equalizing method of the present invention.

FIG. 3 depicts an eye pattern illustrating the signal output of the equalizer 4 when the overall transmission frequency response H(f) is given by the curve (c) in FIG. 2. The eye pattern is an example when the minimum run length d is 3 and the recording density increment coefficient K is 1.5. Thus, we can see that the present invention can improve the open area ratio of eye pattern to a great extent as compared with the usual ones.

Figure 4A:
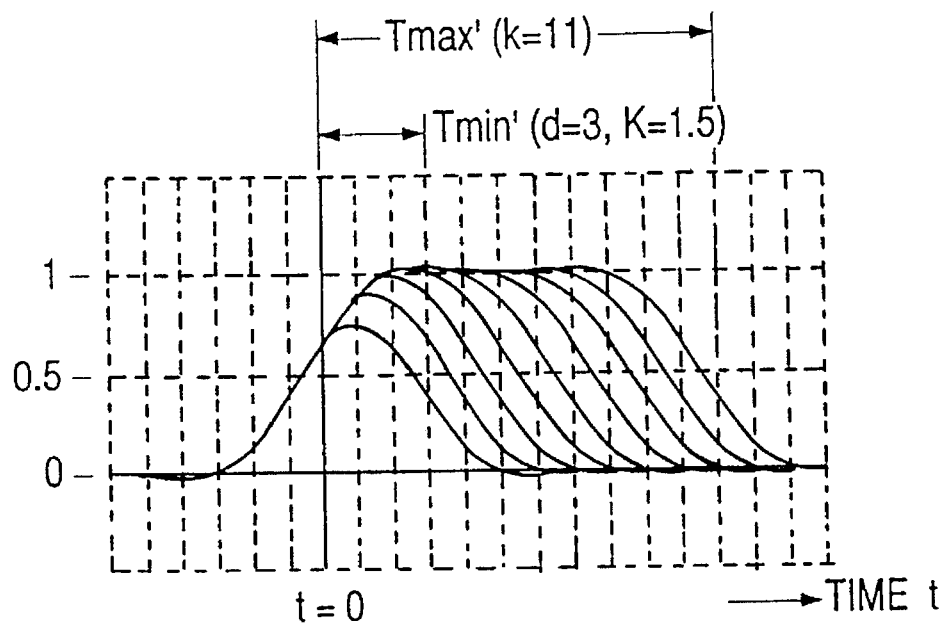
FIG. 4A and B depicts an example of responses to isolated pulses with use of the equalizing method of the present invention as compared with that of a prior art.
Figure 4B:
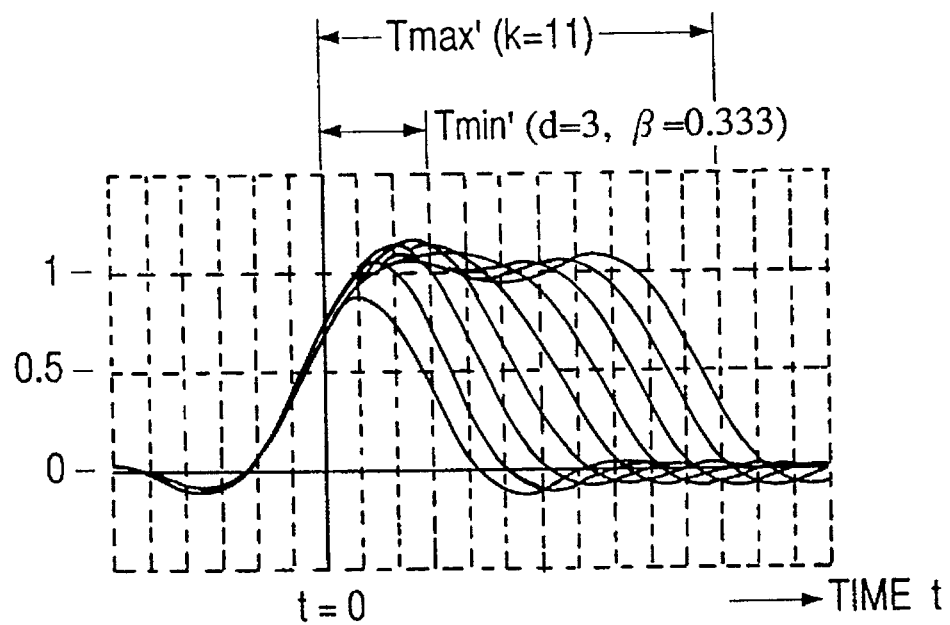
Figure 11:
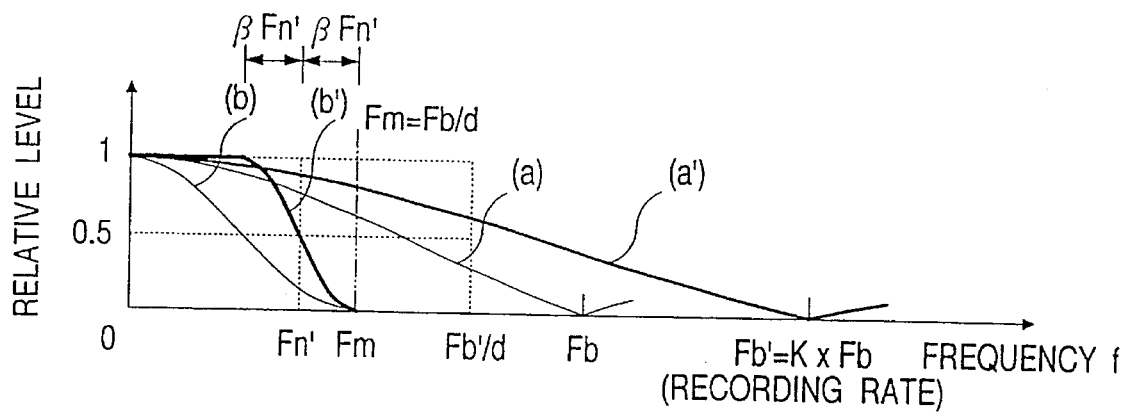
FIG. 11 depicts a frequency response of the prior equalizing method with the recording density increased.
Figure 12:
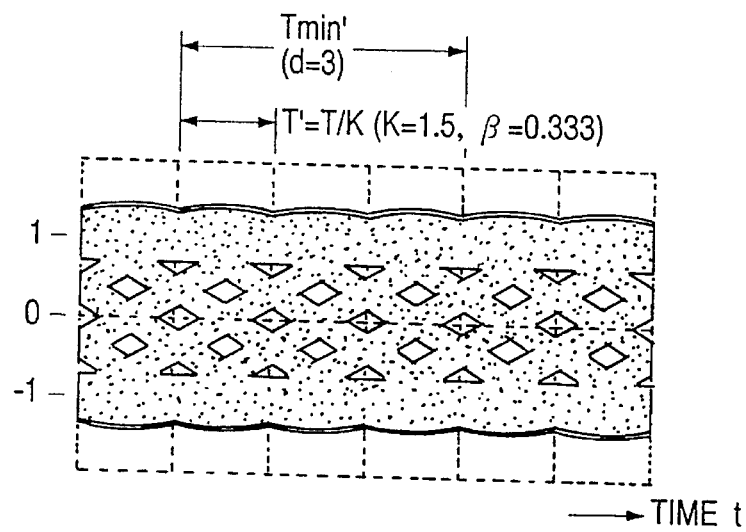
FIG. 12 depicts an example of eye pattern with use of the prior equalizing method with the recording density increased; and, FIG. 13 depicts an block diagram illustrating an example of construction for the equalizer 4 shown in FIG. 1.

FIG. 4 depicts graphs illustrating waveforms that have isolated wave responses overlapped together from a 3T' pulse corresponding to the minimum run length d to a 11T' pulse corresponding to the maximum run length k. FIG. 4(A) depicts a graph illustrating a waveform of the equalizing method of the present invention shown in FIG. 1. FIG. 4(B) depicts a graph illustrating a waveform of the previous equalizing method shown in FIG. 11. Comparing the waveforms of the both equalizing methods up to t=0, that of the present invention shown in FIG. 4(A) has virtually all pulses from the 3T' pulse to the 11T' pulse overlapped together, but that of the previous equalizing method shown in FIG. 4(B) has not quite pulses overlapped. It is hardly necessary that the difference is given in the eye patterns in FIGS. 3 and 12. Thus, the equalizing method of the present invention having all the isolated pulses overlapped together gives little interference among the pulses even if the pulses come at random. The equalizing method therefore provides sufficient open area ratio of eye pattern.

The example shown in FIG. 3 has the minimum run length d of 3 and the recording density increment coefficient K of 1.5, but the present invention is not limited to those values. The minimum run length d can be made not less than 2, and the recording density increment coefficient K can be in a range of 1 to 2.

Figure 5A:
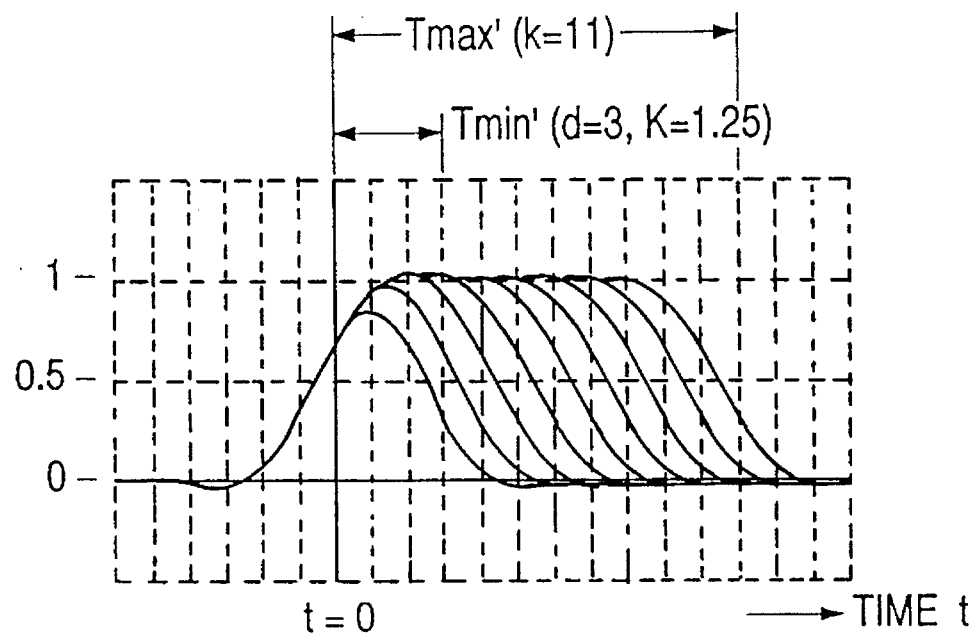
FIG. 5A and B depicts a graph and a pattern illustrating another example of responded waveforms and eye pattern with use of the equalizing method of the present invention.
Figure 5B:
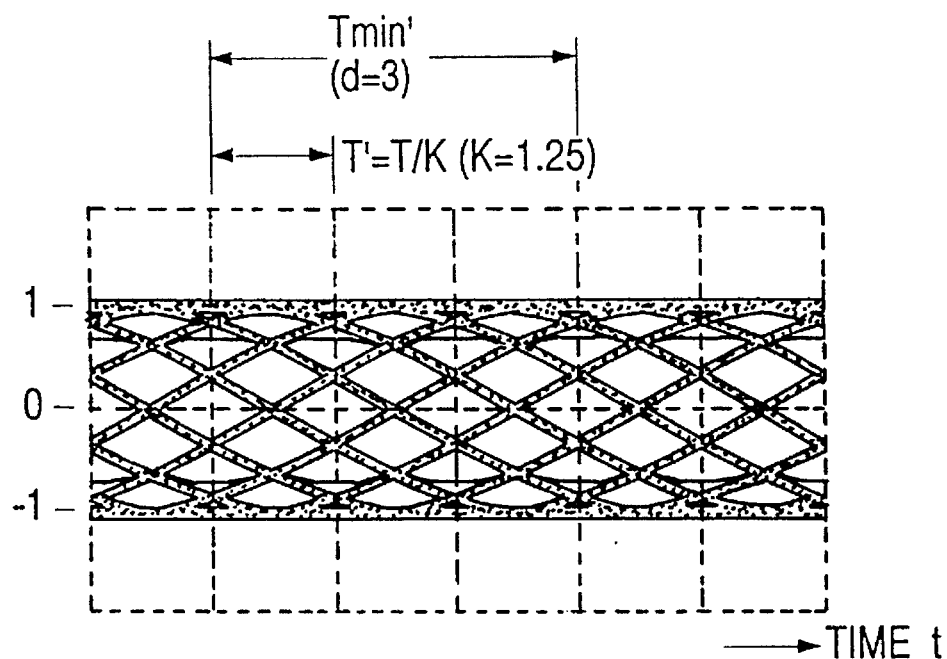
Figure 6A:
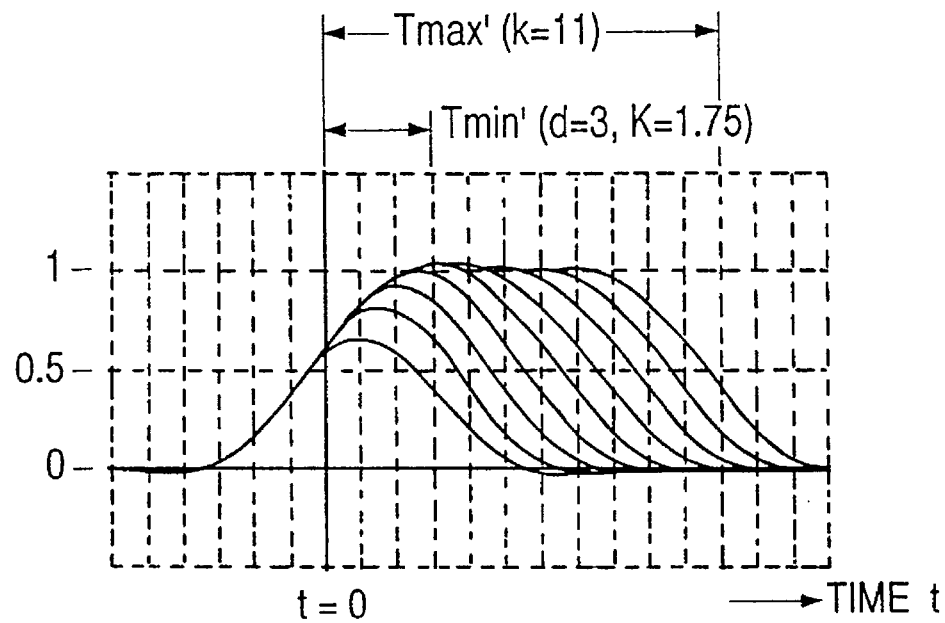
FIG. 6A and B depicts a graph and a pattern illustrating still another example of responded waveforms and eye pattern with use of the equalizing method of the present invention.
Figure 6B:
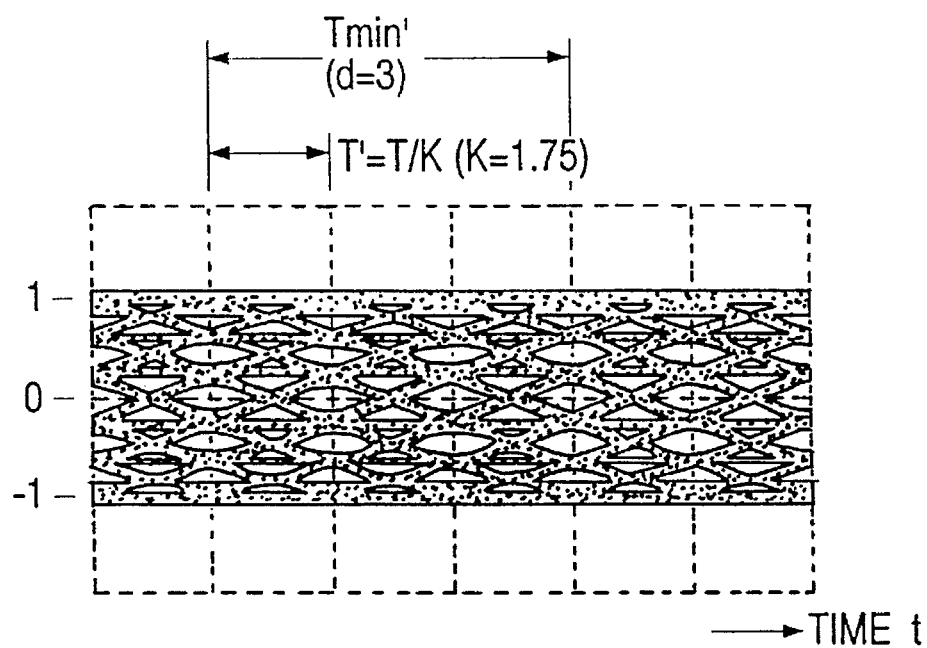

FIGS. 5 and 6 depict other graphs and patterns illustrating examples of responded waveforms and eye patterns when the recording density increment coefficient K is 1.25 and 1.75, with the minimum run length d of the both examples being 3. FIGS. 5(A) and 6(A) show the waveforms responded to the isolated pulses. FIGS. 5(B) and 6(B) show the eye patterns. For K=1.25 in FIG. 5, the open area ratio of eye pattern is high as the recording density increment coefficient K is small, causing no problems. For K=1.75 in FIG. 6, on the other hand, the open area ratio of eye pattern is low as the recording density increment coefficient K is large. The reason, as seen from the responses to the isolated pulses in FIG. 6(A), is that the pulses are overlapped together, but the whole pulse width are so extended that the level is lowered. If the recording density increment coefficient K is wished to be large, therefore, a signal-to-noise ratio of the recoding and reproducing system has to be made sufficiently high. The recording density increment coefficient K of the present invention is limited by the signal-to-noise ratio. However, as described above, if the minimum run length d is 3, the present invention can achieve the recoding and reproducing system or recording medium that has the recording density improved up to around 1.75 times.

Figure 7A:
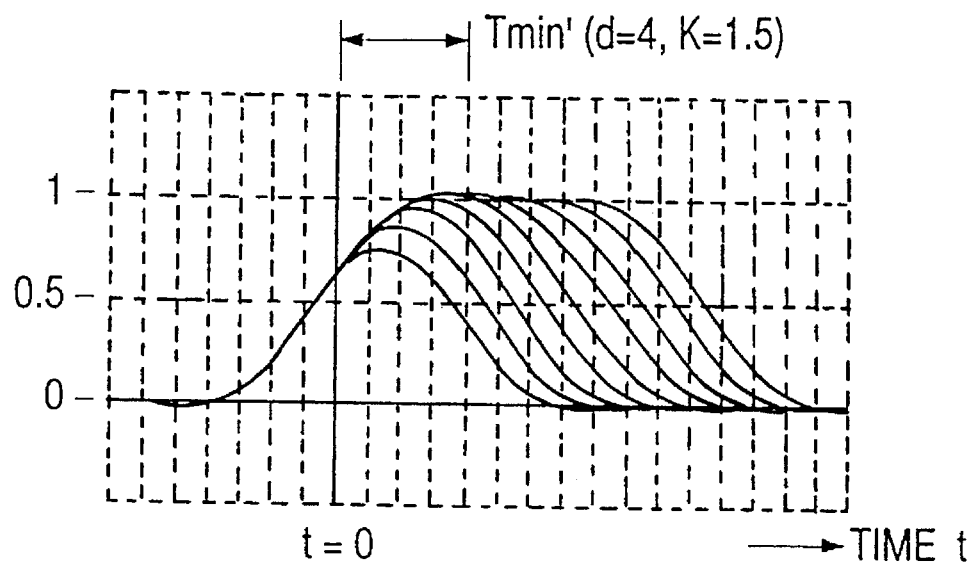
FIG. 7A and B depicts a graph and a pattern illustrating still another example of responded waveforms and eye pattern with use of the equalizing method of the present invention.
Figure 7B:
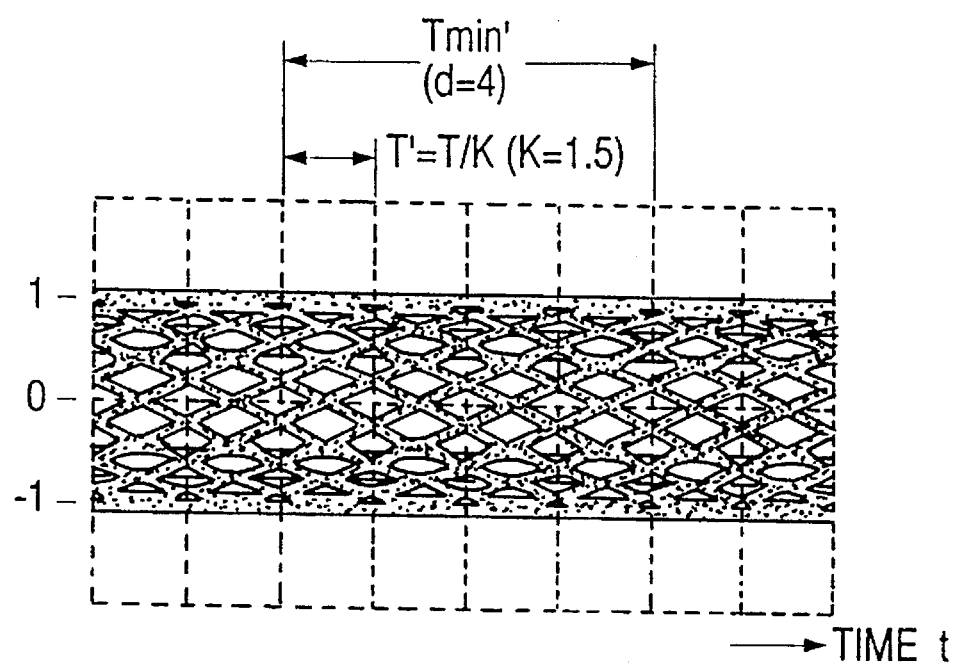

FIG. 7 depicts a graph and a pattern illustrating another example of responded waveforms and eye pattern when the minimum run length d is 4 and the recording density increment coefficient K is 1.5. FIG. 7(A) shows the waveforms responded to the isolated pulses. FIG. 7(B) shows the eye pattern. As can be seen from the figure, all the isolated pulses are overlapped together to provide a sufficient open area ratio of eye pattern. When the minimum run length d is 4, therefore, the recording density can be increased up to around 1.5 times.

Figure 8A:
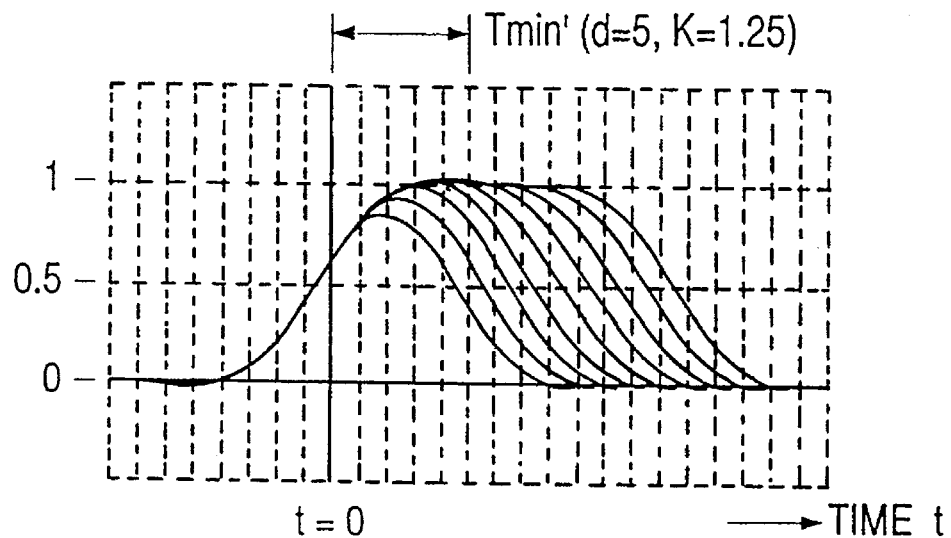
FIG. 8A and B depicts a graph and a pattern illustrating still another example of responded waveforms and eye pattern with use of the equalizing method of the present invention.
Figure 8B:
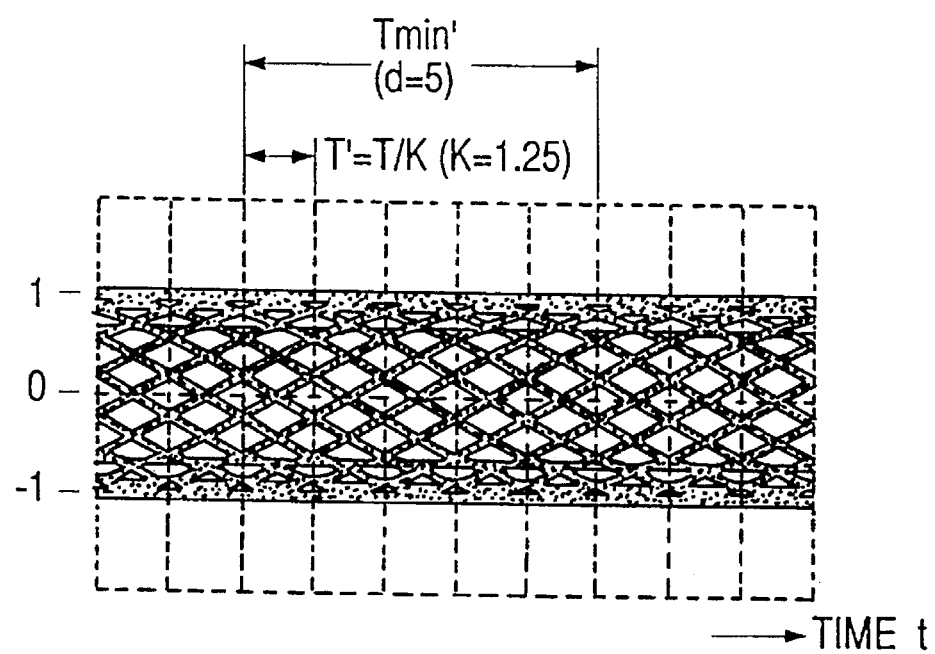
Figure 9:
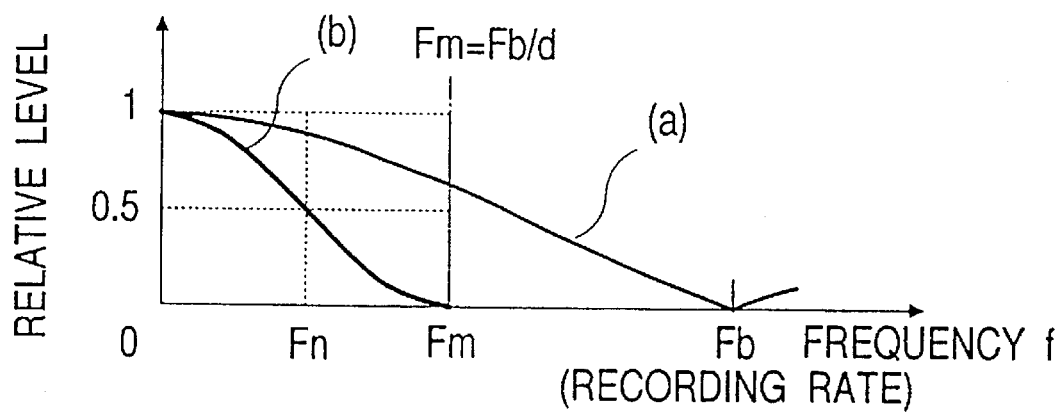
FIG. 9 depicts a frequency response of the equalizing method of the prior art.
Figure 10:
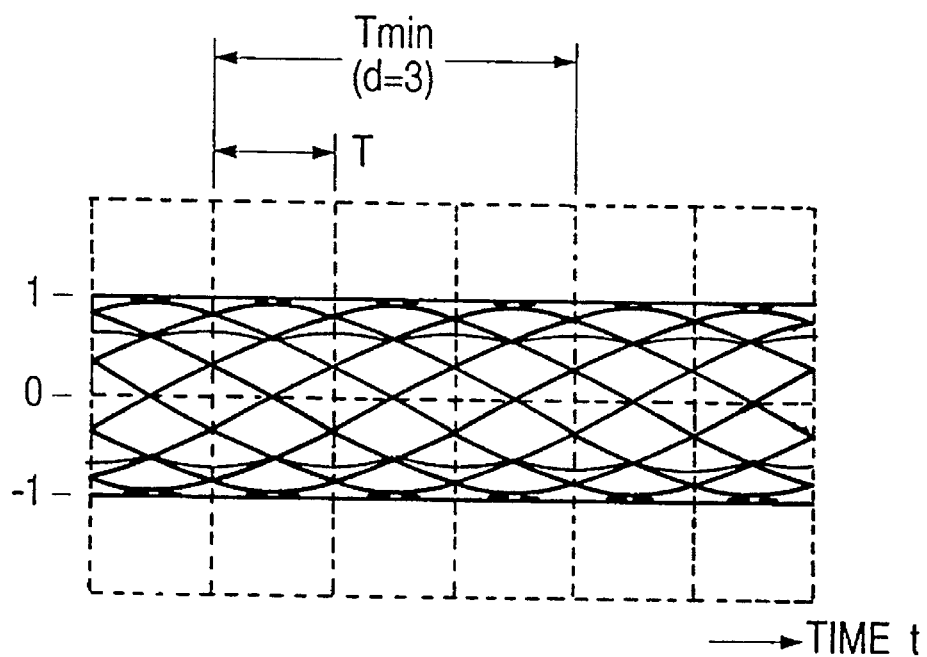
FIG. 10 depicts an example of eye pattern with use of the prior equalizing method.

FIG. 8 depicts still another graph and pattern illustrating an example of responded waveforms and eye pattern when the minimum run length d is 5 and the recording density increment coefficient K is 1.25. FIG. 8(A) shows the waveforms responded to the isolated pulses. FIG. 8(B) shows the eye pattern. As can be seen from the figure, also all the isolated pulses are overlapped together to provide a sufficient open area ratio of eye pattern. When the minimum run length d is 5, therefore, the recording density can be increased up to around 1.25 times.

As described so far, the present invention can increase the recording density of the digital information irrespective of the recording medium and modulating method.

Modifications other than described above can be made by those skilled in the art without departing from the spirit and scope of the present invention. The above description of the preferred embodiment of the present invention and the preferred dimensions thereof are given by way of example only and is not limited to the specific embodiments hereinbefore discussed but extends to all modifications. The scope of the present invention is defined in the claims appended hereto. All different modifications and changes made within the spirit and scope of the appended claims will be within the present invention.

What is claimed is:

1. A recording and reproducing system, comprising a RLL (run length limited) coder for modulating a digital information signal to be recorded in a recording medium with use of a run length limited code, an equalizer for equalizing a signal reproduced from the recording medium, and a decoder for decoding a signal equalized by the equalizer to the original digital information signal, wherein a frequency response of the equalizer is approximately set so that an overall transmission frequency characteristic H(f) of the RLL coder, the recording medium and the equalizer to an impulse becomes the one given by an equation below $$H(f) = \cos\left(\frac{\pi}{2} \cdot \frac{f}{Fm}\right)$$

where Fm denotes a cut-off frequency of the recording medium.

2. A recording and reproducing system according to claim 1 wherein the cut-off frequency Fm of the recording medium is given by an equation below $$Fm = \frac{Fb}{d \cdot K} \quad (K > 1)$$

where Fb denotes a recording bit rate of the digital information signal modulated by the RLL coder, d is a minimum run length of the run length limited code, and K is an increment coefficient of recording density of the recording medium.

3. A recording and reproducing system, comprising a RLL (run length limited) coder for modulating a digital information signal to be recorded in a recording medium with use of a run length limited code having a minimum run length d that is an integer not less than 2, an equalizer for equalizing a signal reproduced from the recording medium, and a decoder for decoding a signal equalized by the equalizer to the original digital information signal, wherein a recording bit rate Fb of the digital information signal modulated by the RLL coder is made as given by an equation below $$Fb = Fm \cdot d \cdot K \: K > 1$$

where Fm denotes a cut-off frequency of the recording medium and K is an increment coefficient of recording density of the recording medium, and wherein a frequency response of the equalizer is approximately set so that an overall transmission frequency characteristic H(f) of the RLL coder, the recording medium and the equalizer to an impulse becomes the one given by an equation below $$H(f) = \cos\left(\frac{\pi}{2} \cdot \frac{f}{Fm}\right).$$

4. A recording and reproducing system according to claim 3 wherein the recording medium is an optical disk and the cut-off frequency Fm of the recording medium is given by an equation below $$Fm \approx \frac{2 \cdot V \cdot NA}{\lambda}$$

where λ denotes a wavelength of laser, NA is a numerical aperture of an optical system and V is a linear velocity of the recording medium.

5. A recording and reproducing system according to claim 3 wherein the minimum run length d is 3 and the recording density increment coefficient K is not greater than 1.75.

6. An equalizing method of digital information signal for use in a recording and reproducing system, comprising a RLL (run length limited) coder for modulating a digital information signal to be recorded in a recording medium with use of a run length limited code, an equalizer for equalizing a signal reproduced from the recording medium, and a decoder for decoding a signal equalized by the equalizer to the original digital information signal, wherein the digital information signal reproduced from the recording medium is equalized with use of the equalizer that has a frequency response that approximately makes an overall transmission frequency characteristic H(f) of the RLL coder, the recording medium and the equalizer to an impulse become the one given by an equation below $$H(f) = \cos\left(\frac{\pi}{2} \cdot \frac{f}{Fm}\right)$$

where Fm denotes a cut-off frequency of the recording medium.

7. An equalizing method of digital information signal for use in a recording and reproducing system, comprising a RLL (run length limited) coder for modulating a digital information signal to be recorded in a recording medium with use of a run length limited code having a minimum run length d that is an integer not less than 2, an equalizer for equalizing a signal reproduced from the recording medium, and a decoder for decoding a signal equalized by the equalizer to the original digital information signal, wherein a recording bit rate Fb of the digital information signal modulated by the RLL coder is made as given by an equation below $$Fb = Fm \cdot d \cdot K \quad (K>1)$$

where Fm denotes a cut-off frequency of the recording medium and K is an increment coefficient of recording density of the recording medium, and wherein the digital information signal reproduced from the recording medium is equalized with use of the equalizer that has a frequency response that approximately makes an overall transmission frequency characteristic H(f) of the RLL coder, the recording medium and the equalizer to an impulse become the one given by an equation below $$H(f) = \cos\left(\frac{\pi}{2} \cdot \frac{f}{Fm}\right).$$

8. An equalizing method according to claim 7 wherein the recording medium is an optical disk and the cut-off frequency Fm of the recording medium is given by an equation below $$Fm \approx \frac{2 \cdot V \cdot NA}{\lambda}$$

where λ denotes a wavelength of laser, NA is a numerical aperture of an optical system and V is a linear velocity of the recording medium.

9. An equalizing method according to claim 7 wherein the minimum run length d is 3 and the recording density increment coefficient K is not greater than 1.75.

10. A recording medium of digital information signal for use in a recording and reproducing system, comprising a RLL (run length limited) coder for modulating a digital information signal to be recorded in the recording medium with use of a run length limited code having a minimum run length d that is Cn integer not less than 2, an equalizer for equalizing a signal reproduced from the recording medium, and a decoder for decoding a signal equalized by the equalizer to the original digital information signal, wherein a recording bit rate Fb of the digital information signal modulated by the RLL coder is made as given by an equation below $$Fb = Fm \cdot d \cdot K \quad (K>1)$$

where Fm denotes a cut-off frequency of the recording medium and K is an increment coefficient of recording density of the recording medium, and wherein the digital information signal reproduced from the recording medium is equalized with use of the equalizer that has a frequency response that approximately makes an overall transmission frequency characteristic H(f) of the RLL coder, the recording medium and the equalizer to an impulse become the one given by an equation below $$H(f) = \cos\left(\frac{\pi}{2} \cdot \frac{f}{Fm}\right).$$

11. A recording medium according to claim 10, wherein the recording medium is an optical disk and the cut-off frequency Fm of the recording medium is given by an equation below $$Fm \approx \frac{2 \cdot V \cdot NA}{\lambda}$$

where λ denotes a wavelength of a lazer, NA is a numerical aperture of an optical system and V is a linear velocity of the recording medium.

12. A recording medium according to claim 10, wherein the minimum run length d is 3 and the recording density increment coefficient K is not greater than 1.75.

* * * * *